United States Patent [19]
Dunn et al.

[11] Patent Number: 5,677,368
[45] Date of Patent: Oct. 14, 1997

[54] PROCESS FOR INCREASING THE SOLIDS CONTENT OF NITRILE RUBBER LATEX

[75] Inventors: Edwin Reed Dunn, Rocky Face, Ga.; Gary Lee Burroway, Doylestown, Ohio

[73] Assignee: The Goodyear Tire & Rubber Company, Akron, Ohio

[21] Appl. No.: 665,779

[22] Filed: Jun. 18, 1996

[51] Int. Cl.$^6$ .................................................. C08C 1/14
[52] U.S. Cl. ........................................................ 523/335
[58] Field of Search ............................................. 525/335

[56] References Cited

U.S. PATENT DOCUMENTS

| | | | |
|---|---|---|---|
| 3,380,958 | 4/1968 | Rees | 523/335 |
| 3,459,693 | 8/1969 | Halper et al. | 523/335 |
| 3,573,243 | 3/1971 | Bennett | 523/335 |
| 3,573,246 | 3/1971 | Bennett | 523/335 |
| 3,781,236 | 12/1973 | Bassham et al. | 523/335 |
| 3,795,647 | 3/1974 | Ripley-Duggan | 523/335 |
| 3,892,702 | 7/1975 | Burke, Jr. | 523/335 |
| 4,103,074 | 7/1978 | Hertel et al. | 528/485 |
| 4,623,678 | 11/1986 | Moore et al. | 523/335 |

*Primary Examiner*—Thomas R. Weber
*Attorney, Agent, or Firm*—Alvin T. Rockhill

[57] ABSTRACT

By utilizing the process of this invention, nitrile rubber latices having solids contents of greater than 60 percent can be prepared from standard nitrile rubber latices having solids contents of less than 30 percent. The present invention more specifically discloses a process for increasing the solids content of a low solids nitrile rubber latex which comprises the steps of (1) concentrating the low solids nitrile rubber latex by removal of water therefrom to produce an intermediate solids nitrile rubber latex having a solids content which is within the range of about 35 percent to about 45 percent, wherein the low solids nitrile rubber latex has a solids content which is less than about 30 percent; (2) subjecting the intermediate solids nitrile rubber latex to a pressure which is within the range of about $3.45 \times 10^6$ Pa to about $6.9 \times 10^7$ Pa at a temperature which is within the range of about 120° F. to about 170° F. to produce a pressure agglomerated nitrile rubber latex; and (3) further concentrating the pressure agglomerated nitrile rubber latex by removal of water therefrom to produce a high solids nitrile rubber latex having a solids content of greater than about 60 percent.

20 Claims, No Drawings

PROCESS FOR INCREASING THE SOLIDS CONTENT OF NITRILE RUBBER LATEX

BACKGROUND OF THE INVENTION

Nitrile rubber latices are used in a wide variety of industrial applications. Such latices are synthesized by the copolymerization of acrylonitrile and 1,3-butadiene in an aqueous emulsion under free radical polymerization conditions. Nitrile rubber latices accordingly contain repeat units which are derived from 1,3-butadiene monomer and acrylonitrile monomer. The repeat units which are derived from 1,3-butadiene monomer and acrylonitrile monomer differ from the monomers from which they were derived in that a double bond is consumed by the polymerization. In any case, nitrile rubbers normally contain from about 20 percent to about 45 percent repeat units which are derived from acrylonitrile and from about 55 percent to about 80 percent repeat units which are derived from 1,3-butadiene.

In some applications it is desirable and in other applications it is critical for nitrile rubber latices to have a high solids content. For instance, it is extremely important for nitrile rubber latices used in making powder puffs and oil-resistant foam rubber products to have a high solids content. In such applications, the nitrile rubber latex will have a solids content of at least about 60 percent and will preferably have a solids content of at least about 65 percent. For instance, nitrile rubber latices having solids contents which are within the range of about 68 percent to about 71 percent are sometimes desirable.

The solids content of most latices can be increased to a certain extent by simply removing water therefrom. This is generally accomplished by evaporating excess water from the latex. The evaporative removal of water from latex is normally facilitated by the application of vacuum in conjunction with mild heating. However, this simple technique can only be used to increase the solids contain of latex to a certain degree. This is because the latex becomes much too viscous for most applications and ultimately becomes unstable after too much water has been removed by this simple technique. For instance, the solids contents of most nitrile rubber latices can normally be increased to about 45 to 50 percent by evaporative water removal without encountering stability problems.

U.S. Pat. No. 4,824,886 relates to 2-phosphonobutane-1, 2,4-tricarboxylic acid derivatives which can be obtained by reaction of tricarboxylic acids with $C_{6-20}$ alcohols and which are suitable as auxiliaries (emulsifiers) for emulsion polymerization. U.S. Pat. No. 4,824,886 discloses pressure agglomeration with a homogenizer of the Manton-Gaulin type at 20° C. and 400 bar to form an agglomerate having an average particle diameter of 250 nm which can be used as graft bases for the preparation of ABS or other thermoplastic molding materials.

SUMMARY OF THE INVENTION

By utilizing the techniques of this invention, nitrile rubber latices which have solids contents of greater than 60 percent can be made from conventional nitrile rubber latices having much lower solids contents. The high solids nitrile rubber latices made by using this technique are stable to solids contents which are as high as about 72 percent.

This invention more specifically discloses a process for increasing the solids content of a low solids nitrile rubber latex which comprises the steps of (1) concentrating the low solids nitrile rubber latex by removal of water therefrom to produce an intermediate solids nitrile rubber latex having a solids content which is within the range of about 35 percent to about 45 percent, wherein the low solids nitrile rubber latex has a solids content which is less than about 30 percent; (2) subjecting the intermediate solids nitrile rubber latex to a pressure which is within the range of about $3.45 \times 10^6$ Pa to about $6.9 \times 10^7$ Pa at a temperature which is within the range of about 120° F. to about 170° F. to produce a pressure agglomerated nitrile rubber latex; and (3) further concentrating the pressure agglomerated nitrile rubber latex by removal of water therefrom to produce a high solids nitrile rubber latex having a solids content of greater than about 60 percent.

The subject invention further discloses a technique for increasing the solids content of a nitrile rubber latex having an intermediate solids content which comprises the steps of (1) subjecting the nitrile rubber latex having the intermediate solids content to a pressure which is within the range of about $3.45 \times 10^6$ Pa to about $6.9 \times 10^7$ Pa at a temperature which is within the range of about 120° F. to about 170° F. to produce a pressure agglomerated nitrile rubber latex, wherein the nitrile rubber having the intermediate solids content has a solids content which is within the range of about 35 percent to about 45 percent; and (2) concentrating the pressure agglomerated nitrile rubber latex by removal of water therefrom to produce a high solids nitrile rubber latex having a solids content of greater than about 60 percent.

DETAILED DESCRIPTION OF THE INVENTION

The first step of the process of this invention is carried out by simply concentrating the latex to a solids content which is within the range of about 35 percent to about 45 percent. In cases where the latex already has a solids content which is within the range of about 35 percent to about 45 percent, this concentration step is, of course, not necessary. However, conventional nitrile rubber latices typically have an initial solids content which is within the range of about 20 percent to about 30 percent. It is more typical for standard nitrile rubber latices to have a solids content which is within the range of about 25 percent to about 28 percent. In any case, this concentration step is accomplished by removing water from the latex to attain a solids content which is within the desired range of 35 percent to 45 percent.

Water in the latex can be removed therefrom by simply allowing water in the latex to evaporate. The evaporative removal of water from latex is normally facilitated by the application of vacuum in conjunction with mild heating. The latex will normally be heated to a temperature which is within the range of about 70° F. (21° C.) to about 200° F. (93° C.), with as much vacuum as possible being applied. To avoid thermal degradation of the nitrile rubber in the latex, the evaporative water removal step will preferably be conducted at a temperature of less than about 180° F. (82° C.) and will most preferably will be conducted at a temperature of less than about 140° F. (60° C.). However, to attain good rates of water removal, the evaporative water removal step will normally be conducted at a temperature of at least 100° F. (38° C.) and will most preferably be conducted at a temperature of at least 120° F. (49° C.). For these reasons, evaporative water removal is preferably conducted at a temperature which is within the range of about 100° F. (38° C.) to about 180° F. (82° C.). The evaporative water removal is most preferably conducted at a temperature which is within the range of about 120° F. (49° C.) to about 140° F. (60° C.).

After the nitrile rubber latex has been concentrated to an intermediate solids nitrile rubber latex having a solids content which is within the range of about 35 percent to about 45 percent, it is subjected to a pressure agglomeration step. The latex will preferably be concentrated to a solids content which is within the range of about 38 percent to about 42 percent before it is subjected to the pressure agglomeration step.

A fatty acid soap can optionally be added to the intermediate solids nitrile rubber latex prior to pressure agglomeration to enhance latex stability. The amount of fatty acid soap added will typically be within the range of 0.0 phr to about 1.5 phr (parts by weight per hundred parts by weight of rubber). Typically from about 0.5 phr to about 1.0 phr of fatty acid soap will be added. It is generally preferred to add 0.6 phr to about 0.8 phr of fatty acid soap to the intermediate solids nitrile rubber latex prior to pressure agglomeration.

It is critical for the pressure agglomeration step to be conducted at a temperature which is within the range of about 120° F. (49° C.) to about 170° F. (77° C.). The pressure agglomeration step will preferably be conducted at a temperature which is within the range of about 125° F. (52° C.) to about 140° F. (60° C.). It is most preferred for the pressure agglomeration step to be conducted at a temperature which is within the range of about 130° F. (54° C.) to about 135° F. (57°).

The pressure agglomeration is achieved by subjecting the nitrile rubber latex to a pressure of at least 500 lbs/in$^2$ (3.45×10$^6$ Pa). This can be done by using a high pressure pump to force the latex through a small orifice. For instance, the latex can be pressure-agglomerated in a Manton-Gaulin homogenizer. The pressure agglomeration will typically be conducted utilizing a pressure which is within the range of about 3.45×10$^6$ Pa to about 6.9×10$^7$ Pa. The pressure agglomeration will more typically be conducted utilizing a pressure which is within the range of about 3.45×10$^6$ Pa to about 3.45×10$^7$ Pa. The pressure agglomeration will preferably be conducted at a pressure which is within the range of about 1.38×10$^7$ Pa to about 2.76×10$^7$ Pa. The pressure agglomeration will most preferably be conducted at a pressure which is within the range of about 1.72×10$^7$ Pa to about 2.41×10$^7$ Pa.

After the pressure agglomeration step, the pressure-agglomerated latex is further concentrated by removal of water therefrom. The removal of water from the pressure-agglomerated latex is normally facilitated by the application of vacuum in conjunction with mild heating. The pressure-agglomerated latex will normally be heated to a temperature which is within the range of about 70° F. (21° C.) to about 200° F. (93° C.) with as much vacuum as possible being applied. To avoid thermal degradation of the nitrile rubber in the pressure-agglomerated latex, the evaporative water removal step will preferably be conducted at a temperature of less than about 180° F. (82° C.) and will most preferably will be conducted at a temperature of less than about 140° F. (60° C.). However, to attain good rates of water removal, this evaporative water removal step will normally be conducted at a temperature of at least 100° F. (38° C.) and will most preferably be conducted at a temperature of at least 120° F. (49° C.). For these reasons, evaporative water removal is preferably conducted at a temperature which is within the range of about 100° F. (38° C.) to about 180° F. (82° C.). The evaporative water removal is most preferably conducted at a temperature which is within the range of about 120° F. (49° C.) to about 140° F. (60° C.).

A sufficient amount of water will normally be removed from the pressure-agglomerated latex to increase the solids content of the latex to greater than about 60 percent. In many cases, the solids content of the nitrile rubber latex will be increased to greater than about 65 percent. After the final water removal step, the nitrile rubber latex will typically have a solids content which is within the range of about 60 percent to about 72 percent. The high solids latex made by the process of this invention will more typically have a solids content which is within the range of about 62 percent to about 68 percent. However, in some applications, it is desirable for the nitrile rubber latex to have a solids content which is within the range of about 68 percent to about 71 percent. After the nitrile rubber latex has been concentrated, it can be utilized in desired industrial applications.

This invention is illustrated by the following examples which are merely for the purpose of illustration and are not to be regarded as limiting the scope of the invention or the manner in which it can be practiced. Unless specifically indicated otherwise, all parts and percentages are given by weight.

EXAMPLE 1

In this experiment, a high solids nitrile rubber latex was made from a standard nitrile rubber latex having an initial solids content of about 20 percent. The nitrile rubber in the latex used in this experiment contained about 67 percent butadiene and about 33 percent acrylonitrile. In the procedure used, the standard nitrile rubber latex was concentrated to an intermediate solids nitrile rubber latex by the application of heat and vacuum. More specifically, a solids content of about 40 percent was achieved by the application of vacuum while heating the latex to a temperature of about 160°–180° F.

After being concentrated, 0.25 phr of potassium oleate was added to the intermediate solids nitrile rubber latex. The intermediate solids nitrile rubber latex was then subjected to a pressure agglomeration step. This was accomplished by homogenization of the latex in a Manton-Gaulin homogenizer which attained a pressure of 3000 lbs/in$^2$ (2.07×10$^7$ Pa). The latex was maintained at a temperature of 140° F. (60° C.) during the pressure agglomeration step.

The pressure-agglomerated nitrile rubber latex was then further concentrated by the application of vacuum at a temperature of about 160°–180° F. The application of heat and vacuum was continued until sufficient water was removed from the latex to achieve a solids content of 70.2 percent.

EXAMPLE 2

In this experiment, the procedure described in Example 1 was repeated except for the fact that potassium oleate was not added to the intermediate solids nitrile rubber latex. A final solids content of 70.1 percent was attained and the viscosity of the high solids latex was only slightly greater than that of the high latex made by the procedure described in Example 1. However, in another similar experiment, coagulation occurred.

EXAMPLE 3

In this experiment, the procedure described in Example 1 was repeated except for the fact that the intermediate solids nitrile rubber latex was pressure-agglomerated utilizing a pressure of 1500 lbs/in$^2$ (1.03×10$^7$ Pa). A final solids content of 64.8 percent was attained and the viscosity of the high solids latex was somewhat less than that of the high solids latex made by the procedure described in Example 1.

EXAMPLE 4

In this experiment, the procedure described in Example 1 was repeated except for the fact that the intermediate solids nitrile rubber latex was pressure-agglomerated at a temperature of 160° F. (71° C.). A final solids content of 66.9 percent was attained and the viscosity of the high solids latex was somewhat less than that of the high solids latex made by the procedure described in Example 1.

EXAMPLE 5

In this experiment, the procedure described in Example 1 was repeated except for the fact that the intermediate solids nitrile rubber latex was pressure-agglomerated at a pressure of only 2000 lbs/in$^2$ (1.38×10$^7$ Pa) and except for the fact that 0.5 phr of potassium oleate was added to the intermediate solids nitrile rubber latex. A final solids content of 62.6 percent was attained and the viscosity of the high solids latex was significantly less than that of the high solids latex made by the procedure described in Example 1.

EXAMPLE 6

In this experiment, the procedure described in Example 1 was repeated except for the fact that the intermediate solids nitrile rubber latex was pressure-agglomerated at a pressure of 5000 lbs/in$^2$ (3.45×10$^7$ Pa). A final solids content of 69.5 percent was attained with the viscosity of the high solids latex being somewhat more than that of the high solids latex made by the procedure described in Example 1.

Comparative Example 7

In this experiment, the procedure described in Example 6 was repeated except for the fact that the temperature of the pressure-agglomerated step was reduced to room temperature (about 20° C.) with 0.75 phr of potassium oleate being added to the intermediate solids latex. However, in this experiment, pressure agglomeration did not occur.

Comparative Example 8

In this experiment, the procedure described in Comparative Example 7 was repeated except for the fact that 1.5 phr of potassium oleate was added to the intermediate solids latex. However, in this experiment, pressure agglomeration did not occur.

Comparative Example 9

In this experiment, the procedure described in Example 1 was repeated except for the fact that the intermediate solids nitrile rubber latex was pressure-agglomerated at a pressure of 500 lbs/in$^2$ (3.45×10$^6$ Pa) at room temperature. The conditions used in this experiment resulted in most of the latex coagulating.

Comparative Example 10

In this experiment, the procedure described in Comparative Example 1 was repeated except for the fact that 0.5 phr of potassium oleate was added to the intermediate solids nitrile rubber latex. However, a maximum solids content of only 51 percent could be attained.

While certain representative embodiments and details have been shown for the purpose of illustrating the subject invention, it will be apparent to those skilled in this art that various changes and modifications can be made therein without departing from the scope of the subject invention.

What is claimed is:

1. A process for increasing the solids content of a low solids nitrile rubber latex which comprises the steps of (1) concentrating the low solids nitrile rubber latex by removal of water therefrom to produce an intermediate solids nitrile rubber latex having a solids content which is within the range of about 35 percent to about 45 percent, wherein the low solids nitrile rubber latex has a solids content which is less than about 30 percent; (2) subjecting the intermediate solids nitrile rubber latex to a pressure which is within the range of about 3.45×10$^6$ Pa to about 6.9×10$^7$ Pa at a temperature which is within the range of about 120° F. to about 170° F. to produce a pressure-agglomerated nitrile rubber latex; and (3) further concentrating the pressure-agglomerated nitrile rubber latex by removal of water therefrom to produce a high solids nitrile rubber latex having a solids content which is within the range of about 60 percent to about 72 percent.

2. A process for increasing the solids content of a nitrile rubber latex having an intermediate solids content which comprises the steps of (1) subjecting the nitrile rubber latex having the intermediate solids content to a pressure which is within the range of about 3.45×10$^6$ Pa to about 6.9×10$^7$ Pa at a temperature which is within the range of about 120° F. to about 170° F. at to produce a pressure-agglomerated nitrile rubber latex, wherein the nitrile rubber having the intermediate solids content has a solids content which is within the range of about 35 percent to about 45 percent; and (2) concentrating the pressure-agglomerated nitrile rubber latex by removal of water therefrom to produce a high solids nitrile rubber latex having a solids content which is within the range of about 60 percent to about 72 percent.

3. A process as specified in claim 1 wherein the intermediate solids nitrile rubber latex is subjected in step (2) to a pressure which is within the range of about 3.45×10$^6$ Pa to about 3.45×10$^7$ Pa.

4. A process as specified in claim 3 wherein up to about 1.5 phr of a fatty acid soap is added to the intermediate solids nitrile rubber latex prior to subjecting the latex to pressure in step (2).

5. A process as specified in claim 4 wherein the intermediate solids nitrile rubber latex is subjected in step (2) to a temperature which is within the range of about 125° F. to 140° F.

6. A process as specified in claim 5 wherein the intermediate solids nitrile rubber latex is subjected in step (2) to a pressure which is within the range of about 1.38×10$^7$ Pa to about 2.76×10$^7$ Pa.

7. A process as specified in claim 3 wherein the low solids nitrile rubber latex is concentrated in step (1) to an intermediate solids nitrile rubber latex having a solids content of about 38 percent to about 42 percent.

8. A process as specified in claim 3 wherein the pressure-agglomerated nitrile rubber latex is further concentrated in step (3) to a solids content of at least about 65 percent.

9. A process as specified in claim 8 wherein the intermediate solids nitrile rubber latex is subjected in step (2) to a pressure which is within the range of about 1.72×10$^7$ Pa to about 2.41×10$^7$ Pa.

10. A process as specified in claim 9 wherein the intermediate solids nitrile rubber latex is subjected in step (2) to a temperature which is within the range of about 130° F. to 135° F.

11. A process as specified in claim 3 wherein from about 0.5 phr to about 1.0 phr of a fatty acid soap is added to the intermediate solids nitrile rubber latex prior to subjecting the latex to pressure in step (2).

12. A process as specified in claim 5 wherein from about 0.5 phr to about 1.0 phr of a fatty acid soap is added to the intermediate solids nitrile rubber latex prior to subjecting the latex to pressure in step (2).

13. A process as specified in claim 6 wherein from about 0.6 phr to about 0.8 phr of a fatty acid soap is added to the intermediate solids nitrile rubber latex prior to subjecting the latex to pressure in step (2).

14. A process as specified in claim 3 wherein the pressure-agglomerated nitrile rubber latex is further concentrated in step (3) to a solids content which is within the range of about 60 percent to about 72 percent.

15. A process as specified in claim 3 wherein the pressure-agglomerated nitrile rubber latex is further concentrated in step (3) to a solids content which is within the range of about 62 percent to about 68 percent.

16. A process as specified in claim 3 wherein the pressure-agglomerated nitrile rubber latex is further concentrated in step (3) to a solids content which is within the range of about 68 percent to about 71 percent.

17. A process as specified in claim 2 wherein up to about 1.5 phr of a fatty acid soap is added to the nitrile rubber latex having an intermediate solids content prior to subjecting the latex to pressure in step (1).

18. A process as specified in claim 17 wherein the latex having an intermediate solids content is subjected in step (1) to a pressure which is within the range of about $3.45 \times 10^6$ Pa to about $3.45 \times 10^7$ Pa.

19. A process as specified in claim 18 wherein the pressure-agglomerated nitrile rubber latex is further concentrated in step (2) to a solids content of at least about 65 percent.

20. A process as specified in claim 19 wherein the nitrile rubber contains from about 20 percent to about 45 percent repeat units which are derived from acrylonitrile and from about 55 percent to about 80 percent repeat units which are derived from 1,3-butadiene.

\* \* \* \* \*